United States Patent [19]
Takeuchi et al.

[11] 4,393,416
[45] Jul. 12, 1983

[54] TRACKING SYSTEM FOR A VIDEOTAPE RECORDER

[75] Inventors: Akihiro Takeuchi, Ikoma; Masaaki Kobayashi, Kawanishi; Kiyoji Fujisawa, Nara, all of Japan

[73] Assignee: Matsushita Electric Industrial Co., Ltd., Osaka, Japan

[21] Appl. No.: 281,043

[22] Filed: Jul. 7, 1981

[30] Foreign Application Priority Data

Jul. 9, 1980 [JP] Japan ................................. 55-94424

[51] Int. Cl.³ .......................................... G11B 21/10
[52] U.S. Cl. .................................... 360/10.2; 360/77
[58] Field of Search ....................... 360/10.3, 10.2, 77, 360/70, DIG. 1, DIG. 75

[56] References Cited
U.S. PATENT DOCUMENTS 4,335,408 6/1982 Dinter .................................. 360/77

*Primary Examiner*—Alan Faber
*Attorney, Agent, or Firm*—Wenderoth, Lind & Ponack

[57] ABSTRACT

A tracking system of the present invention comprises positionable elements, rotary video heads mounted on the positionable elements, a control head, a frequency generator attached to a capstan motor, and a displacing pattern generator. The displacing pattern generator includes counters which count the pulses from the frequency generator and are reset by control signals reproduced by the control head, a still pattern generator, and an adding means which adds the output signal from the counter and the output signal from the still pattern generator. The output signal of the displacing pattern generator is amplified and applied to the positionable elements. As result, the video heads mounted on the positionable elements can properly trace on a recorded video track at both a normal tape speed or at another tape speed.

3 Claims, 59 Drawing Figures

TRACKING SYSTEM FOR A VIDEOTAPE RECORDER

BACKGROUND OF THE INVENTION

This invention generally relates to a tracking system which is employed in a video tape recorder/reproducer, and more particularly to a system for generating a displacing pattern signal applied to a positionable element on which a video head is mounted so as to maintain the video head in substantially undeviating condition with respect to a recorded video track.

Recently, an automatic tracking system has been introduced to a video tape recorder/reproducer. Such system makes possible a proper tracking of the video track recorded on a video tape, reproducing no noise band pictures at any tape speed modes, for example, normal speed mode, slow motion mode, still motion mode, quick motion mode, reverse motion mode and so on.

In the conventional automatic tracking system, video heads are mounted on positionable elements such as piezoelectric element. The positionable element is dithered by a signal from an oscillator. The tracking error signals are detected from the envelope of reproduced signals. According to resultant tracking error signal, a negative feedback (NFB) loop controls the positionable element so that the video head properly follows the recorded track.

In the case that the automatic tracking system described above is applied to a video recorder/reproducer employing a narrow video track width (for example, 20 micrometer), a displacing amplitude of the video head due to the dither signal is restricted within a few micrometer.

Accordingly, the tracking error signal obtained from the envelope signals becomes a signal having a very low S/N ratio. For the improvement of the low S/N ratio, it is necessary to use a L.P.F. having a very low cutoff frequency in the NFB loop. Since the transient response of the loop is limited by this L.P.F., some noise bars appear on the reproduced pictures during a reproduction mode change.

SUMMARY OF THE INVENTION

Accordingly, an object of this invention is to provide a tracking system for a video recorder/reproducer.

Another object of this invention is to provide an accurate displacing pattern signal for a tracking system having a positionable element.

A further object of this invention is to provide an accurate and minimum displacing pattern signal for a tracking system having a positionable element whose dynamic range is limited by its own physical characteristics without regards to the tape speed and video track width.

Primarily, a tracking system of this invention comprises: a transducing means for reproducing video signals recorded along said track on said record medium; a positionable means with said transducing means mounted at a location thereon, said positionable means a being movable at said location for displacing the position of said transducing means; control signal reproducing means for reproducing said control signals recorded along said track on said record medium; a means for dividing the interval of said control signals, said dividing means developing sub-control signals whose number is representative of the transported length of said record medium; a rotating phase detector for detecting the rotating phase of said transducing means; an operational means for developing a displacement pattern signal which is representative of the location of said video track recorded on said record medium with respect to said transducing means by using an output signal from said control signal reproducing means, said sub-control signals, and the output signal from said rotating phase detector; and means for supplying said displacement pattern signal to said positionable means, whereby said transducing means is capable of tracking properly on said recorded video track at an arbitrary transporting speed of said record medium.

DESCRIPTION OF THE PREFERRED EMBODIMENT

Figure 1:
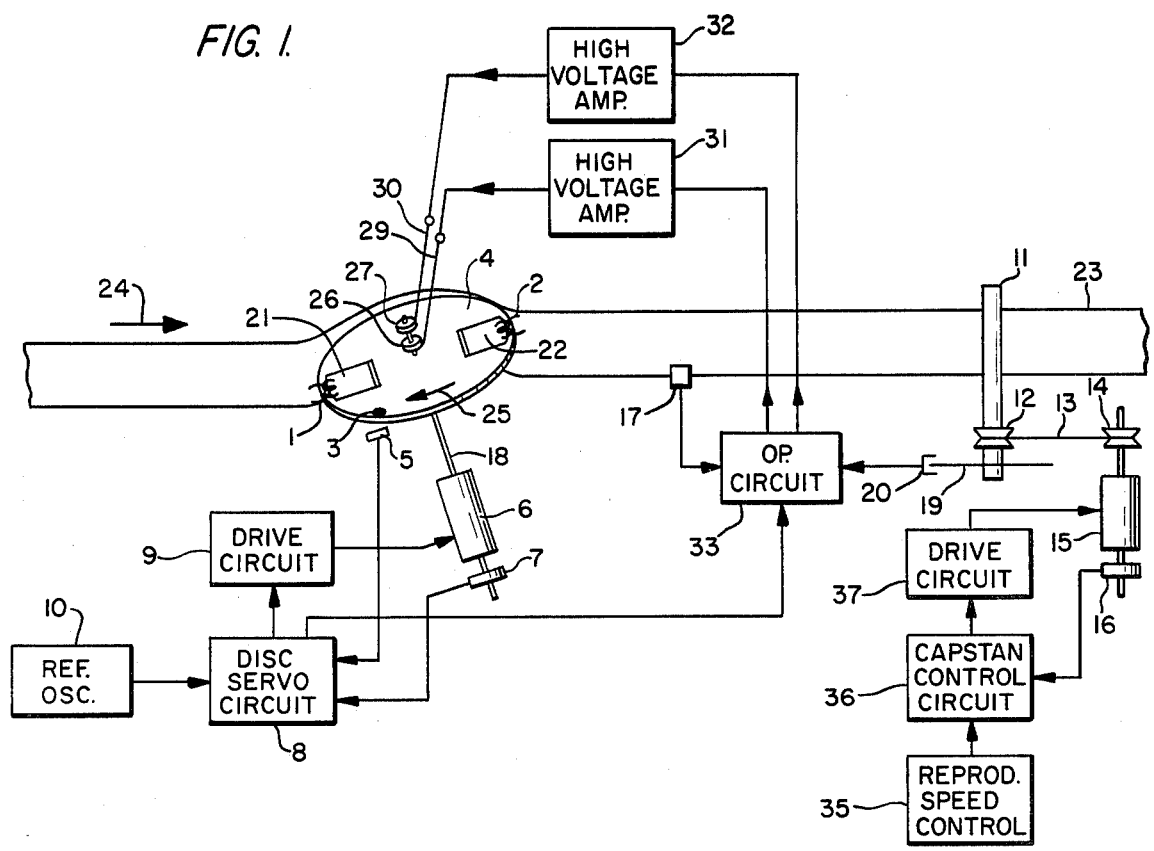
FIG. 1 is a block diagram of an embodiment of a video tape recorder using a tracking system according to this invention.

Now, a preferred embodiment of this invention will be described. FIG. 1 shows a construction of a video tape recorder (reproducing mode) using the tracking apparatus of this invention. Video heads 1 and 2 have the same azimuth angle (for example 6°). The video heads 1 and 2 are mounted at the free end of positionable elements 21 and 22 (for example, bimorph type piezo electric elements). The other ends of elements 21 and 22 are fixed to a rotary disk 4. A magnet 3 indicates the rotating phase of the video heads 1 and 2, being attached to the rotary desk 4. A rotating phase detector 5, which is coupled to the magnet 3, is attached on the fixed side. The rotary disk 4 is driven by the DC motor 6, and the rotating direction is indicated by the arrow 25.

The output signal of a frequency generator (FG) 7, which is mounted at a shaft of a DC motor 6, is supplied to a disk servo circuit 8. The output signals of the rotating phase detector 5 and a reference oscillator 10 are supplied to a disk servo circuit 8. The output signal of the disk servo circuit 8 is supplied to the DC motor 6 through a drive circuit 9. By these means, the rotating phase control of the rotary disk 4 is achieved. The magnetic tape 23 is driven by a capstan 11 and a pinch-roller (not shown), and the driven direction is indicated by an arrow 24. The capstan 11 is driven by a DC motor 15 through a pulley 12, a belt 13, and a pulley 14. The output signal of a frequency generator (FG) 16 which indicates the rotation of the DC motor 15, and the output signal of a reproduction tape speed controller 35 is supplied to a capstan control circuit 36.

The output signal of a control head 17 (hereafter, this signal will be designated as a control signal R), the output signal of the rotating phase detector 20 and the output signal P of the disk servo circuit 8 are supplied to the operational circuit 33. The rotating angular speed of the capstan 11 is detected by a combination of a disk having a number of slits 19 which is attached to the capstan 11 and a rotating phase detector 20. Then, this rotating phase detector 20 generates the pulse in proportion of the rotating angular speed of the capstan 11. For example, when the reproducing tape speed is the same as that used during recording, an assumption is made that the rotating phase detector 20 is chosen so as to generate 10 pulses during one period between the successive reproduced control signal R. Since the rotating phase detector 20 generates the same 10 pulses regardless of changes in the reproducing tape speed, this means that a spacing period between the successive reproduced control signal R is effectively divided into ten divisions. Hereafter, the ouput pulses of the rotating phase detector 20 are called sub-control signals Q.

An embodiment of the rotating phase detector 20 described above comprises a luminous body and a photo detector, and detects the light which passes through the slits on the disk 19, but similar output signals may also be obtained by employing a toothed wheel made of a magnetic material in place of the slit disk 19 and a magnetic flux detector in place of the photo detector 20.

The output signals of the operational circuit 33, which are a displacement pattern, are supplied to the high voltage amplifiers 31 and sufficiently 32, and amplified so as to drive the positionable elements 21 and 22. The amplified signals are supplied to the positionable elements 21 and 22 through conductive brushes 29 and 30, and slip rings 26 and 27. The slip rings are attached to a rotary shaft 18 of the DC motor 6, but are electrically insulated from the shaft 18.

Figure 2:
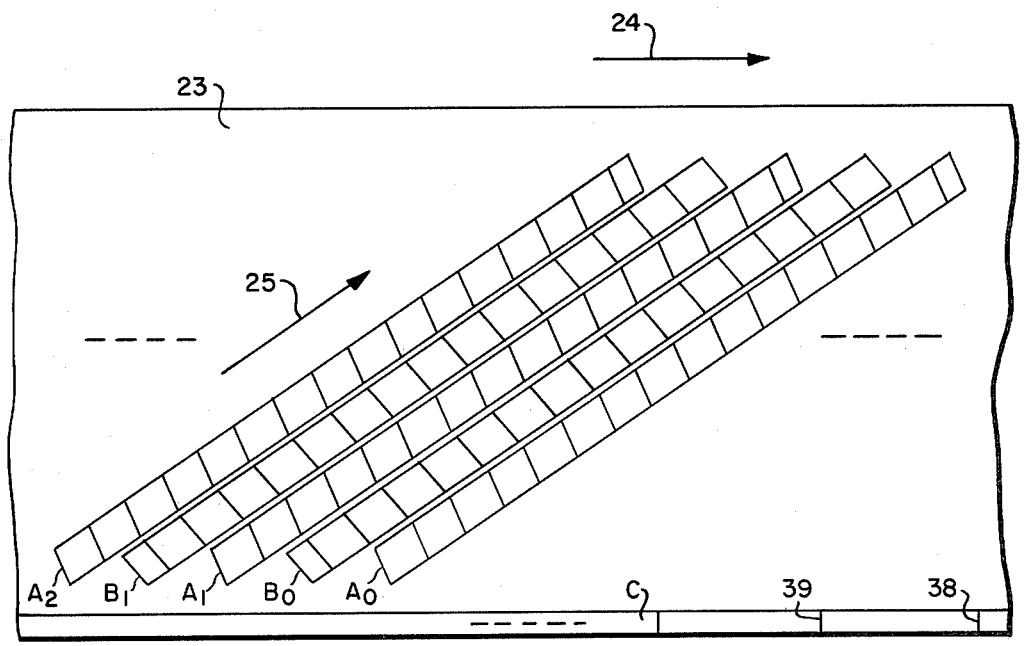
FIG. 2 is a recorded track pattern of a magnetic tape.

FIG. 2 shows the video track pattern recorded on the magnetic tape 23. Tracks $A_0$, $B_0$, $A_1$, $B_1$, and $A_2$ represent one field of video tracks of video signals, and the tracks $A_0$, $A_1$ and $A_2$ are recorded by one video head whose azimuth is $+6°$. The tracks $B_0$ and $B_1$ are recorded by another video head whose azimuth is $-6°$. Track C is the control track. The control signals, which represent the recording phase of the video signals, are recorded on the control track C at the rate of one control signal for every one picture frame. In the recording process, the starting point of track $A_0$ track and the control signal 38 are recorded at the same time. The starting point of track $A_1$ and the control signal 39 are recorded at the same time.

Figure 3:
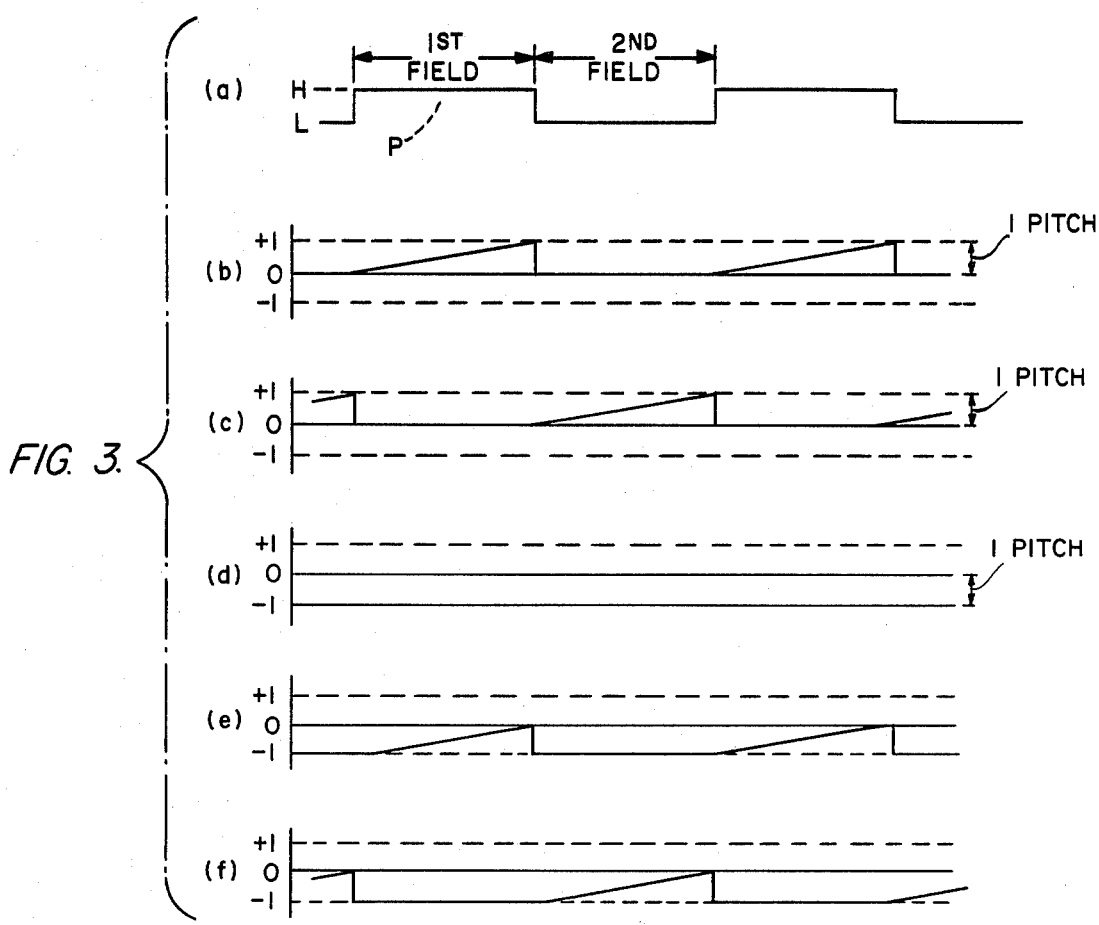
FIGS. 3(a)-(f) show signals appearing at various points of the tracking system drawn in FIG. 1.

In the reproducing process, when the video head 1 is scanning the starting point of track $A_1$ track, the control head 17 simultaneously reproduces the control signal 39. At that time, it is assumed that the transport magnetic tape 23 is stopped, then the trace end point of the video head 1 is the end point of track $B_0$. This scanning period is called the first field. In order to reproduce pictures without a noise-bar, the video head 1 must trace track $A_1$ with an on track condition from beginning to end. By supplying a voltage which increases linearly with scanning, as shown in FIG. 3(b) to the piezoelectric element 21 during the first field, the position of the video head 1 is linearly moved with scanning, and the video head is capable of following the whole video track. This required no movement at the trace starting point of track $A_1$ and a movement of one track pitch at the trace end point. This pattern of movement is called the still pattern.

Figure 4:
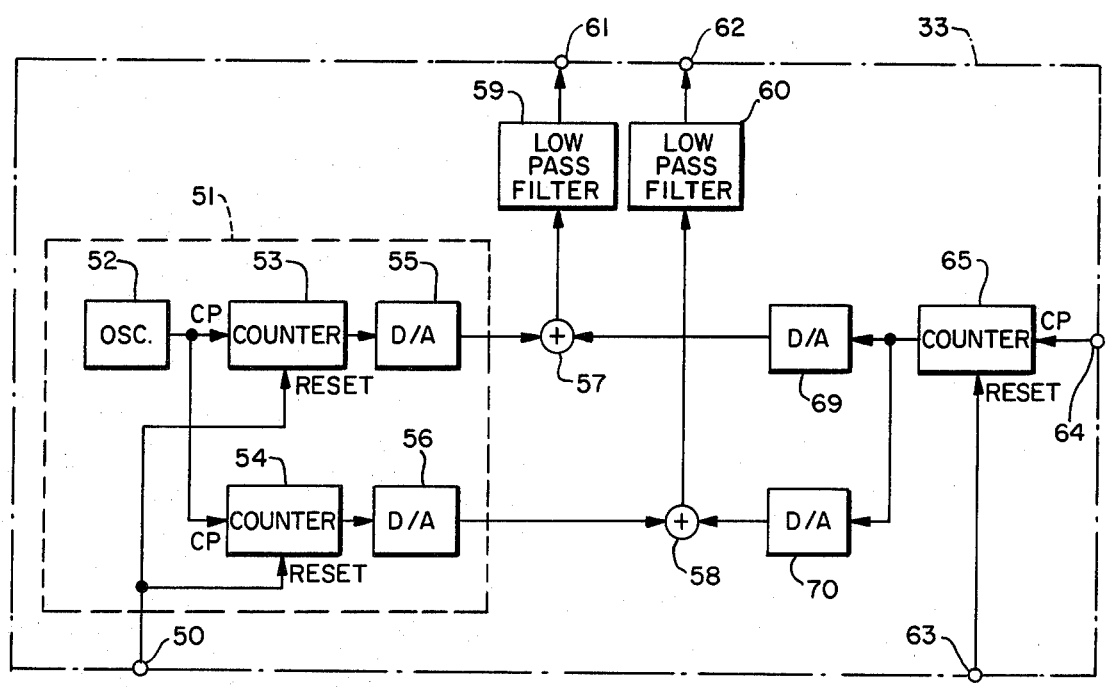
FIG. 4 is a block diagram of an example of the operational circuit 33.

The operational circuit 33 which generates the displacing pattern will hereafter be explained. In FIG. 1, the rotating phase of video head 1 is detected by the magnet 3 and the rotating phase detector 5. The rotating head phase signals are delayed by the disk servo circuit 8, and the signal P is obtained. The signal P has an H level at the first field as shown in FIG. 3(a). The signals P is supplied to the operational circuit 33. A still pattern generator 51 which is part of the operational circuit 33 generates such a movement pattern using the signal P. An embodiment of the operational circuit 33 is shown in FIG. 4. In FIG. 4, the signal P is supplied to the input terminal 50. The still pattern generator 51 consists of an oscillator 52, a counter 53, a counter 54, a D/A (digital-analog) converter 55, and a D/A converter 56. The control signal R which is reproduced from the control head 17 is supplied to the input terminal 63. The sub-control signal Q supplied from the rotating phase detector 20 is supplied to the input terminal 64. These input signals at the input terminals 50, 63, and 64 are supplied to the still pattern generator 51 and a counter 65. Signals are output from the output terminals 61 and 62 through a D/A converter 69, a D/A converter 70, an adder 57, an adder 58, a low pass filter 59 and a low pass filter 60.

Now, the performance of the operation circuit 33 in the still mode will be explained. The oscillator 52 oscillates so as to provide a 300 Hz pulse signal for example. The output pulses of the oscillator 52 are supplied to the CP terminal of the counter 53. A reset terminal of the counter 53 is connected to the input terminal 50. The counter 53 is activated by an H level of the signal P and is reset by an L level of the signal P. The output signals of the counter 53 are supplied to the output terminal 61 through the D/A converter 55, the adder 57 and the low pass filter 59.

The waveform of the output signal is shown in FIG. 3(b). Since the frequency of the oscillator 52 is 300 Hz and the period of the first field is about 16.6 m sec., about five pulses are supplied to the counter 53 during the period. When the video head 1 scans the starting point of track $A_1$, the control signal 39 is reproduced and the magnetic tape 23 is stopped. At that time, since the counter 65 is reset by the control signal 39, the D/A converter 69 generates a zero level signal during the first field, and the adder 57 passes only the output signals of the D/A converter 55 shown in FIG. 3(b). These signals are supplied to the piezoelectric element 21 through the voltage amplifier 31, the conductive brush 29 and the slip ring 26. Consequently, the video head 1 can track track $A_1$ with an on-track condition during the first field.

If the magnetic tape 23 remains stopped, the video head 2 begins to scan track $A_1$ after the video head 1 has scanned track $A_1$. The azimuth of the video head 2 is also +6°. If the output terminal 62 provides the signals shown in FIG. 3(c), the video heads can scan track $A_1$ with on-track condition during the second field. The output signals are supplied to the piezoelectric element 22 through the high voltage amplifier 32, a conductive brush 30 and a slip ring 27. In this case, the output pulses of the oscillator 52 are counted by the counter 54. The signal shown in FIG. 3(c) is outputted to the output terminal 62 through the D/A converter 56, the adder 58 and the low pass filter 60. The counter 54 is activated by a L level of the signal P and is reset by H level of the signal P. As the magnetic tape 23 remains stopped, only the output signal of D/A converter 56 is supplied to the adder 58. The signals shown in FIG. 3(b) and in FIG. 3(c) are called the still pattern.

The above description is concerned with the case wherein the control signal 39 is reproduced by the control head, and the magnetic tape 23 stops instantaneously.

Next, the case will be explained wherein the magnetic tape 23 stops when five sub-control signals Q are counted after the control signal 38 is reproduced. The still pattern generator 51 supplies to adders 57 or 58 the still pattern such as that shown in FIG. 3(b) or FIG. 3(c) according to the rotating phase of the video head (1) or (2), irrespective of the tape speed of the magnetic tape 23. Since ten sub-control signals Q are counted during one period between successive control signals, the fact that tape 23 stops after five sub-control signals Q are counted corresponds to the condition when the starting point of the video heads 1 and 2 is the start of track $B_1$ and the end point of the video heads 1 and 2 is the end of track $A_1$.

By adding a certain bias voltage to the still pattern at the adders 57 and 58, the video heads 1 and 2 can track the track $A_1$ with an on-track condition. A method to obtain such a bias voltage will be explained below. In the operational circuit 33, the terminal CP of the counter 65 is connected to the input terminal 64 which is supplied with the sub-control signal Q. The reset terminal of the counter 65 is connected to the input terminal 63 which is supplied with the control signal R. The counter 65 is reset by the control signal R and counts the sub-control signals Q. The counter 65 counts five sub-control signals Q. Bias voltage corresponding to one pitch of the video track shown in FIG. 3(d) is obtained from D/A converters 69 and 70 which convert the output signals of the counter 65 to an analog signal form. This bias voltage is supplied to the adders 57 and 58. The output terminals 61 and 62 output the signals shown in FIG. 3(e) and FIG. 3(f), and the video heads 1 and 2 can trace the track $A_1$ with an on-track condition.

The phases of video tracks with respect to the video heads 1 and 2 are detected by the control signal R and the sub-control signal Q which divide the period of the control signal effectively and the signal P which indicates the rotating phase of the video heads 1 and 2. Even if the video tracks (that is the magnetic tape 23) stops at any phase with respect to the rotating locus of the video heads 1 and 2, the information of the phase is obtained. The video heads 1 and 2 can therefore trace the tracks with an on-track condition.

Figure 5:
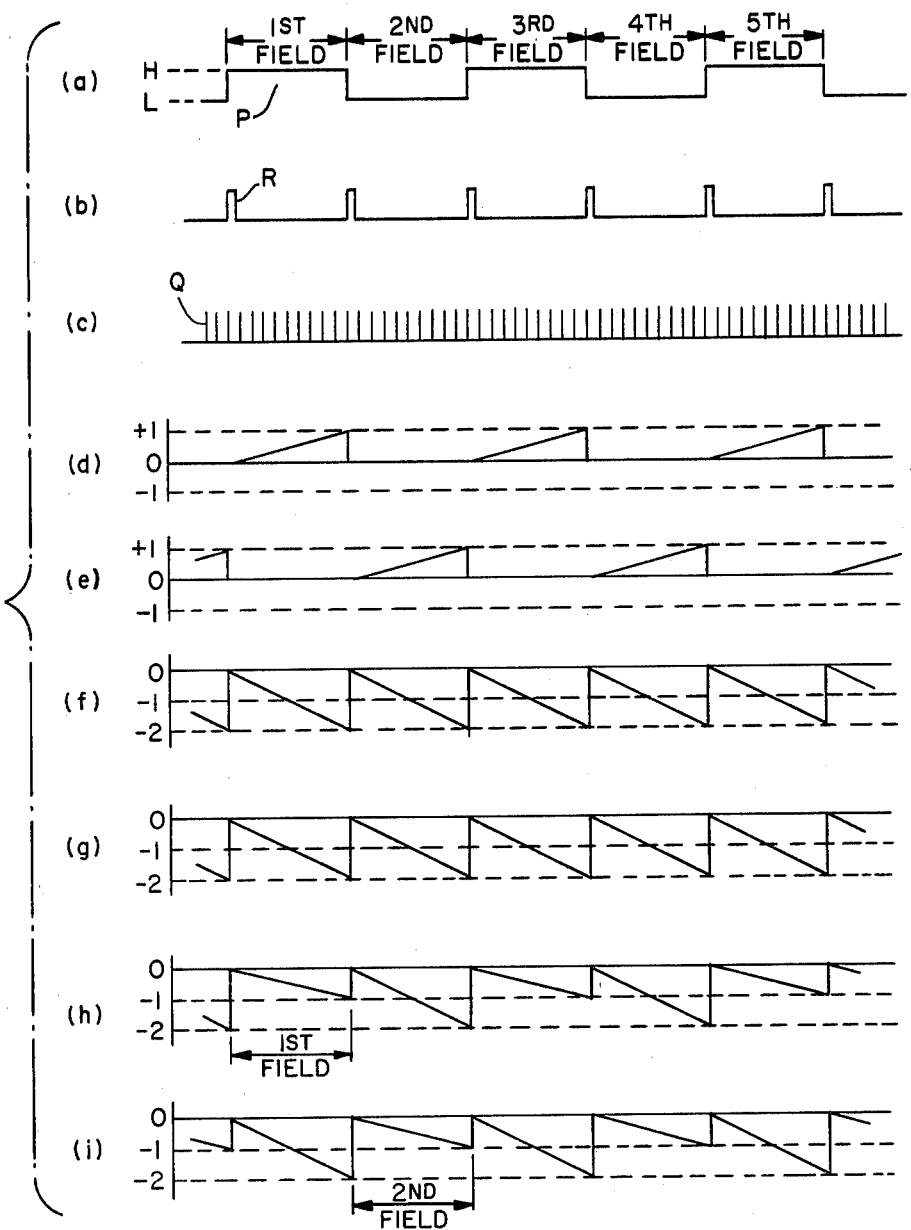
FIGS. 5(a)-(i) shows signals appearing at various points of the operational circuit 33.

It will be described below that the concept described above is valid with an arbitrary tape speed. The case of a double speed play back will be used. FIG. 5(a) shows the signal P which is the rotating phase of the video heads 1 and 2. FIG. 5(b) shows the phase of control signal R. FIG. 5(c) shows the phase of sub-control signal Q. These signals are applied to the input terminals 50, 63, 64 of the operational circuit 33. The signals shown in FIG. 5(d), FIG. 5(e), FIG. 5(f) and FIG. 5(g) are output at the output terminal of the D/A converters 55, 56, 69 and 70. These signals are added to the adders 57 and 58, and are passed to the low pass filters 59 and 60. The signals shown in FIG. 5(h) and FIG. 5(i) are obtained at the output terminals 61, 62. The scale of vertical axis of these figures indicate the level which converts the number of the track pitches. The phase relationship shown in FIG. 5(a) and FIG. 5(b) indicates that the time of the scanning of the start point of track $A_0$ by the video head 1 coincides with the time of the reproducing of the control signal 38 by the control head 17.

If the displacing patterns are not supplied to the piezoelectric element 21, the trace end of the video head 1 is the end point of the track $B_0$. That is to say, if the voltage corresponding to a $-1$ pitch of the video track is supplied to the piezoelectric element 21 during the first field, the video head 1 can trace the video tracks with an on-track condition. FIG. 5(h) shows that the operational circuit 33 developes the voltage corresponding to a $-1$ pitch at the end of the first field. At the start point of the second field, the video head 2 traces the start point of track $A_1$.

If the deflection patterns are not supplied to the piezoelectric element 22, the trace end of the video head 2 is the end point of the track $B_0$. That is to say, if the voltage corresponding to a $-1$ pitch of the video track is supplied to the piezoelectric element 22 during the second field, the video head 2 can track the video tracks with an on-track conditions. FIG. 5(i) shows that the operational circuit 33 develops the voltage corresponding to a $-1$ pitch at end of the second field. The example of double speed playback mentioned above shows the case wherein the rising edge or falling edge of the signal P coincides with the phase of the control signal R.

Figure 6:
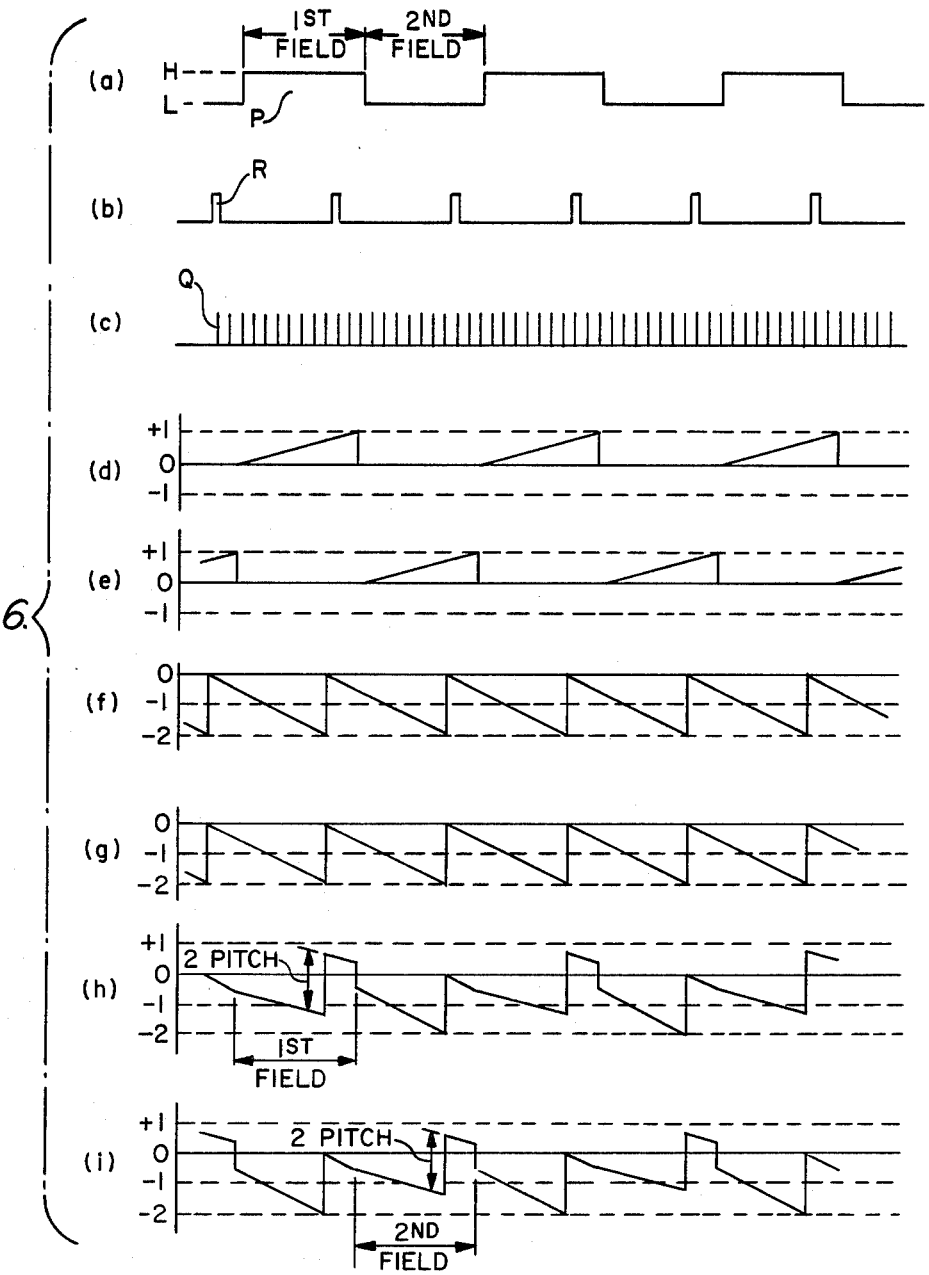
FIGS. 6(a)-(i) shows another state of signals appearing at same points as those of FIG. 5.

FIG. 6 shows the case wherein the phases are shifted during double speed playback. FIG. 6(a), FIG. 6(b) and FIG. 6(c) show the phase relationship between the signal P and the control signal R and the sub-control signal Q. When these signals are applied to the input terminals 50, 63 and 64, the signals shown in FIGS. 6(d), (e), (f) and (g) are output at the output terminals of the D/A converters 55, 56, 69 and 70. The signals shown in FIGS. 6(h) and 6(i) are supplied to the output terminals 61 and 62 through the adders 57 and 58, and the low pass filters 59 and 60. FIGS. 6(a) and 6(b) and 6(c) show that the first field begins after three sub-control signals Q are counted. That is to say, the time of the third sub-control signal application coincides with the time when the scanning of the video track by the video head 1 starts.

The starting point of the first field shown in FIG. 6(h) is biased by an amount corresponding to three sub-control signals with respect to that of FIG. 5(h). This is the same concept of the still mode playback wherein the bias voltage is supplied when the starting point of the scanning of the video heads 1 and 2 is offset from track $A_1$. The bias voltage is obtained by counting the sub-control signals Q. The operational circuit 33 develops the signals shown in FIG. 6(h). At the first half of the field, the video head 1 scans with an on-track condition. At the latter half of first field, the control signal R is reproduced. Since the counter 65 is reset by the control signal R, as shown in FIGS. 6(f) and 6(g), a jump whose amplitude is equal to two video tracks occurs as shown in FIG. 6(h). By this jumping, the scanning locus is suddenly shifted from track $A_1$ to track $A_2$. Since the response of the piezoelectric element 21 is sufficiently fast, the video head 1 scans track $A_1$ with an on-track condition and at the latter half of the field scans track $A_2$ with an on-track condition. As shown in FIG. 6(i), at the second field the video head 2 can scan the track with an on-track condition. The phase relationships of the signal P and the control signal R and the sub-control signal Q are valid without regard to the tape speed of the magnetic tape 23. A magnetic head which responds to magnetic flux is suitable for the control head 32 so as to reproduce the control signal R at an arbitrary tape running speed.

As mentioned above, the phases of the video tracks with respect to the video heads are indicated by the reproduced control signals, the sub-control signals and the rotating phase of the video heads. The sub-control signals divide the interval of the control signals effectively. Since the mechanical positions of the video heads are displaced by the phase information so as to scan the video tracks, the video heads can trace the video tracks with an on-track condition in spite of the tape speed and the reproduced pictures have no noise bars.

Figure 7:
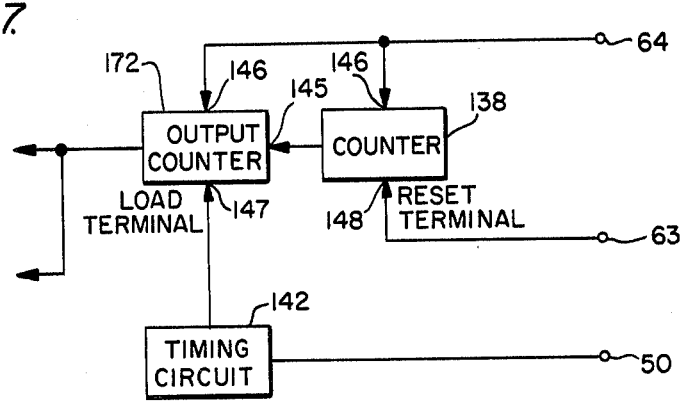
FIG. 7 is a block diagram of a modified counter unit usable in this invention.

One more matter is preferably to be noted. The jumping from track $A_1$ to track $B_1$, as described above, can possibly occur within a period of a field. When an electro-mechanical conversion element (piezoelectric element) does not have a sufficiently fast response, a limited time period is necessary for the abovenoted jumping. Such a time period becomes a cause of noise on a TV screen. A technique for obtaining a noiseless reproduction image even in the case of such an electromechanical conversion element having an insufficient response will be described below. A brief concept thereof is to add a limitation to the counter 65 that no jumping should occur within the time period of any one reproduction field. FIG. 7 shows an example of a counter having such limitation.

Referring to FIG. 7, the illustrated circuit has an output counter 172 and a timing circuit 142 in addition to a counter 138 which functions in the same manner as the counter 65 of FIG. 4. The output counter 172 is preset by the output of the counter 138 in accordance with the timing provided by the timing circuit 142. The output counter 172 then counts the above-described sub-control signal Q, and is reset by the abovenoted control signal R. The timing circuit 142 is driven by the rising and falling edges of the input signal P from the input terminal 50 for the producing pulse signal S, which provide the preset timing of the output counter 172.

Reference numeral 146 is a count input terminal CP of the counter, 145 is a preset data input terminal, 147 is a load terminal, and 148 is a reset terminal. The abovenoted output counter 172 is connected to the D/A converters 69 and 70 of FIG. 4.

Figure 8:
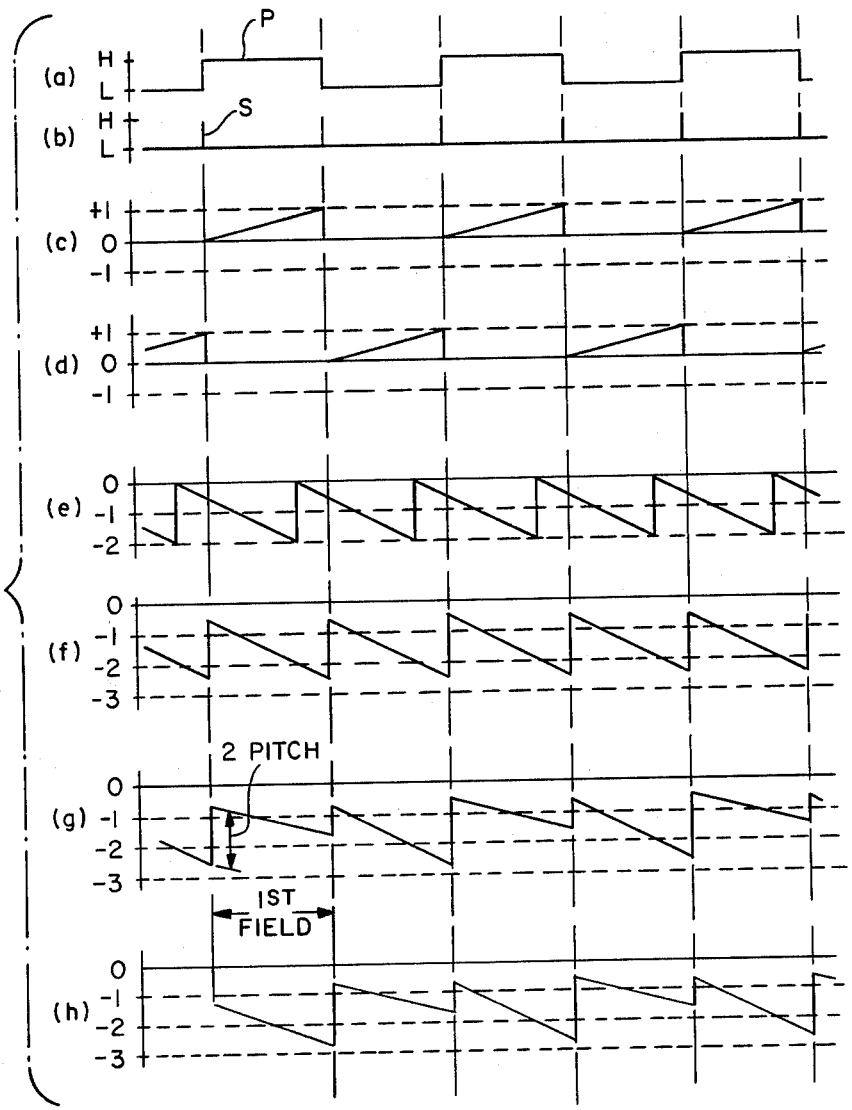
FIGS. 8(a)-(h) shows signals appearing at various points of the operational circuit 33 which includes the counter unit of FIG. 7.

FIG. 8 shows the signal waveforms at various points of the circuit of FIG. 7. FIGS. 8(a), 8(c), 8(d), and 8(e) respectively correspond to FIGS. 6(a), 6(d), 6(e), and 6(f). FIG. 8(b) shows the output pulse signal S of the timing circuit 142 of FIG. 7. FIG. 8(f) shows the output signal of the output counter 172 which has been preset by the counter output values of the counter 138 of FIG. 8(e) in accordance with the timing of the output pulse signal S of FIG. 8(b). These output signals are added by the adders 57 and 58 to the output signals of the D/A converters 55 and 56 (namely, the still pattern as shown in FIGS. 6(d) and 6(e)) via the D/A converters 69 and 70 of FIG. 4. Thus, signals as shown in FIGS. 8(g) and 8(h) are obtained at the output terminals 61 and 62 of FIG. 4. The differences between these signals and the signals of FIGS. 6(h) and 6(i) are that, in the case of the waveforms of FIG. 8, the timing of 2-pitch jumping is limited to the edges of the P signal (namely the instances when the pulse signal S is generated). Since two-pitch jumping of the electromechanical conversion elements 21 and 22 occurs within the vertical retracing period of the reproduced video signals, such jumping does not cause an observable noise on a TV screen even if the electromagnetic conversion element does not have a very fast response.

Next, a technique for eliminating noise even in the vertical retracing period will be described. Noise in the vertical retracing period does not appear on a CRT screen. However, since such noise is in the vicinity of vertical sync signals, a synchronizing circuit contained in a television receiver (not shown) is likely to be misoperated. Furthermore, if the electromechanical conversion elements 21 and 22 have a large mechanical resonance, the abovenoted two-pitch jumping is likely to also influence the CRT screen, and not only the vertical retracing period.

Figure 9:
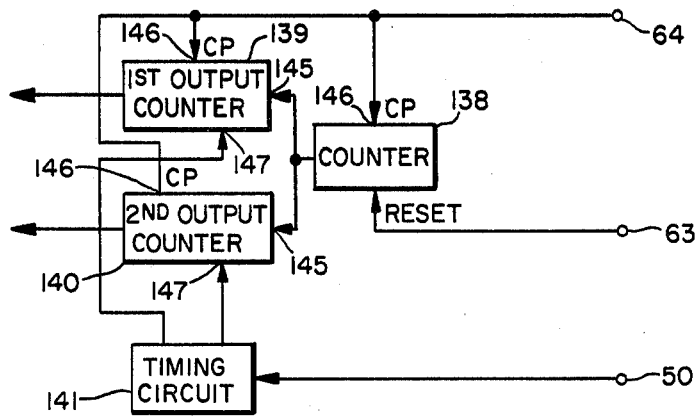
FIG. 9 is a block diagram of another modified counter unit usable in this invention.

A technique for setting the timing of two-pitch jumping at a time point before the beginning of each field will be described below as a technique to overcome the abovenoted problems. As shown in FIG. 9, such a technique is represented by an arrangement comprising a counter 138, a first output counter 139, a second ouput counter 140 and a timing circuit 147. The output signals of the first output counter 139 are applied to the D/A converter 69 of FIG. 4, and the output signals of the second output counter 140 are applied to the D/A converter 70.

Figure 10:
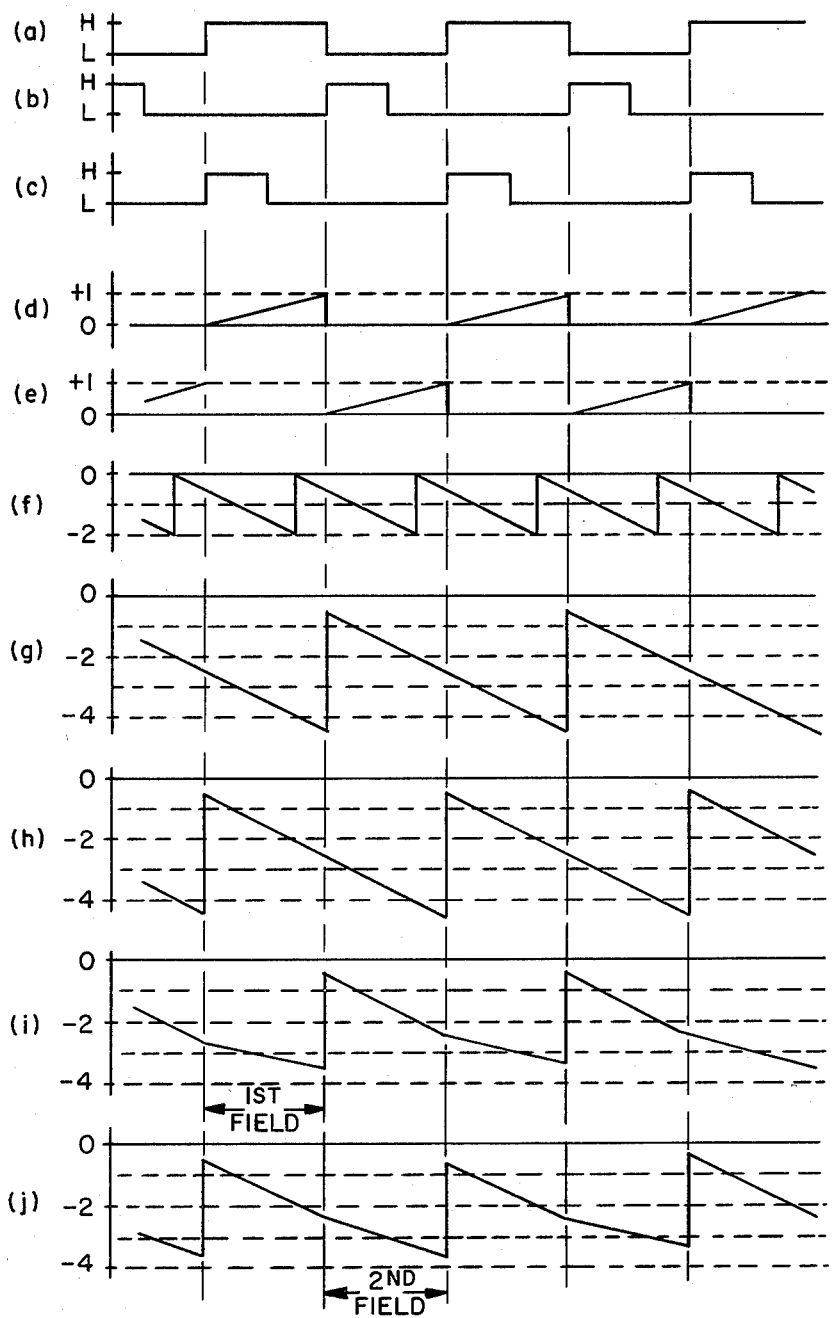
FIGS. 10(a)-(j) shows signals appearing at various points of the operational circuit 33 which includes the counter unit of FIG. 9.

Waveforms appearing at various points of the circuit of FIG. 9 are shown in FIG. 10. In the case of FIG. 9, the period in which the jumping is to be carried out is set at a point at least ½ field before the beginning of the field. This period is the H level period in FIGS. 10(b) and 10(c), and these signals are individually applied to the two magnetic heads. These signals are generated by a timing circuit 141. FIGS. 10(a), 10(b), 10(e), and 10(f) respectively correspond to FIGS. 8(a), 8(c), 8(d), and 8(e).

The output signals of the first output counter 139, the secont output counter 140 are those shown in FIGS. 10(g) and 10(h). These outputs are added to the signals of FIGS. 10(d) and 10(e) by A/D converters 55 and 56 of FIG. 4 just as in the case of FIGS. 6(f) and 6(g) (namely, the still pattern), so that signals as shown in FIGS. 10(i) and 10(j) are obtained at the output terminals 61 and 62. As is apparent from FIGS. 10(i) and 10(j), the jumping occurs at a point one field before the field begins. This is because the jumping of the counter 138 by the control signals occurs outside the jumping performing periods of FIGS. 10(b) and 10(c). When the jumping of the counter 138 occurs in the H level periods of FIGS. 10(b) and (c), then at the same time the jumping occurs in the output counters 139 and 140. However, the jumping does not occur at a position which is after ½ field before the beginning of the field even when the control signal is inputted in any phase relationship with the P signal. So, the slow response of the electromechanical conversion elements 21 and 22 or the ringing thereof does not influence the field.

In the abovenoted descriptions, the period for performing jumping is set between one field before and ½ field before the beginning of the field. However, the end of such a period can be extended to 1/10 field from the above-described ½ field if the electromechanical conversion elements 21 and 22 have fast responses, and the ringing phenomenon thereof is negligible.

Figure 11:
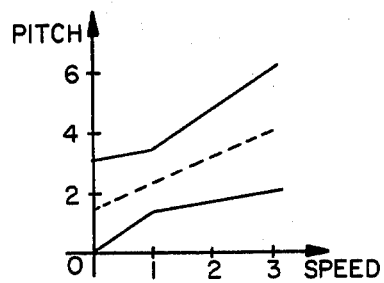
FIG. 11 shows the range of the output signal of the operational circuit 33 which includes the counter unit of FIG. 9.

A technique for using the electro-mechanical conversion elements 21 and 22 to keep a reasonable range at any tape speed is noted below. FIG. 11 shows the area of the upper peak level and the lower peak level of the output signal generated by the circuit of FIG. 4 which includes the counter unit of FIG. 9. The area expands and the center of the area increases as the tape speed becomes high. That is, FIG. 11 indicates that the circuit of FIG. 9 cannot use most of the range of the electro-mechanical conversion elements 21 and 22, which are limited by their own physical characteristics.

Large displacements of the electro-mechanical conversion elements 21 and 22 worsen the touch of the video heads 1, 2 with the magnetic tape so as to decrease the output signal. That is, the video heads do not maintain a right angle with respect to the video track.

Next, a technique for shifting the output range of the circuit of FIG. 9 will be described in order to limit the range of the electro-mechanical conversion elements 21 and 22.

Figure 12:
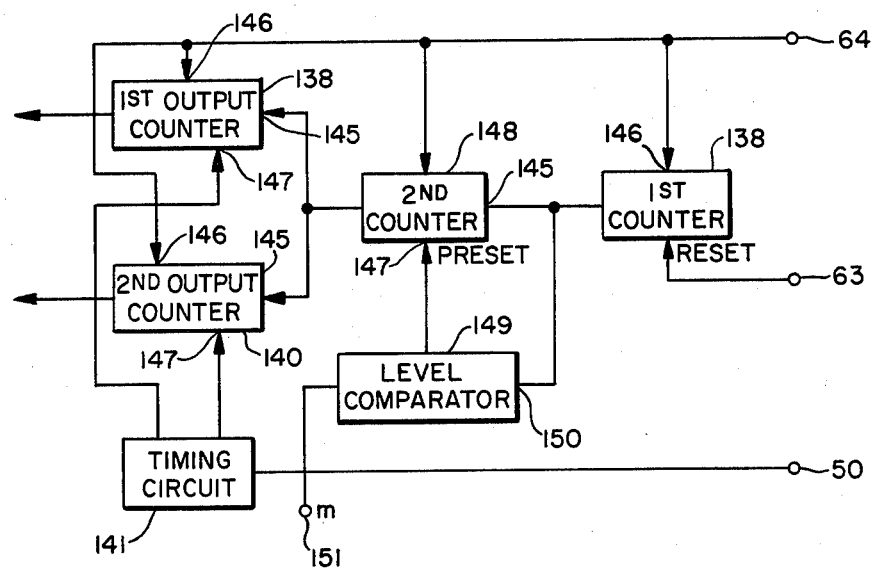
FIG. 12 is a block diagram of another modified counter unit usable in this invention.

An embodiment of the technique is shown in FIG. 12, in which as a counter unit, second counter 148 and a level comparator 149 are added to the circuit of FIG. 9. The level comparator 149 compares the value of the output of the first counter 138 with a value m which is inputted at the data input terminal 151. When the value of the the output of first counter is equal to the data m, the second counter is preset by the output of the first counter 138. After that, the second counter 148 begins to count the sub-control signals.

Figure 13:
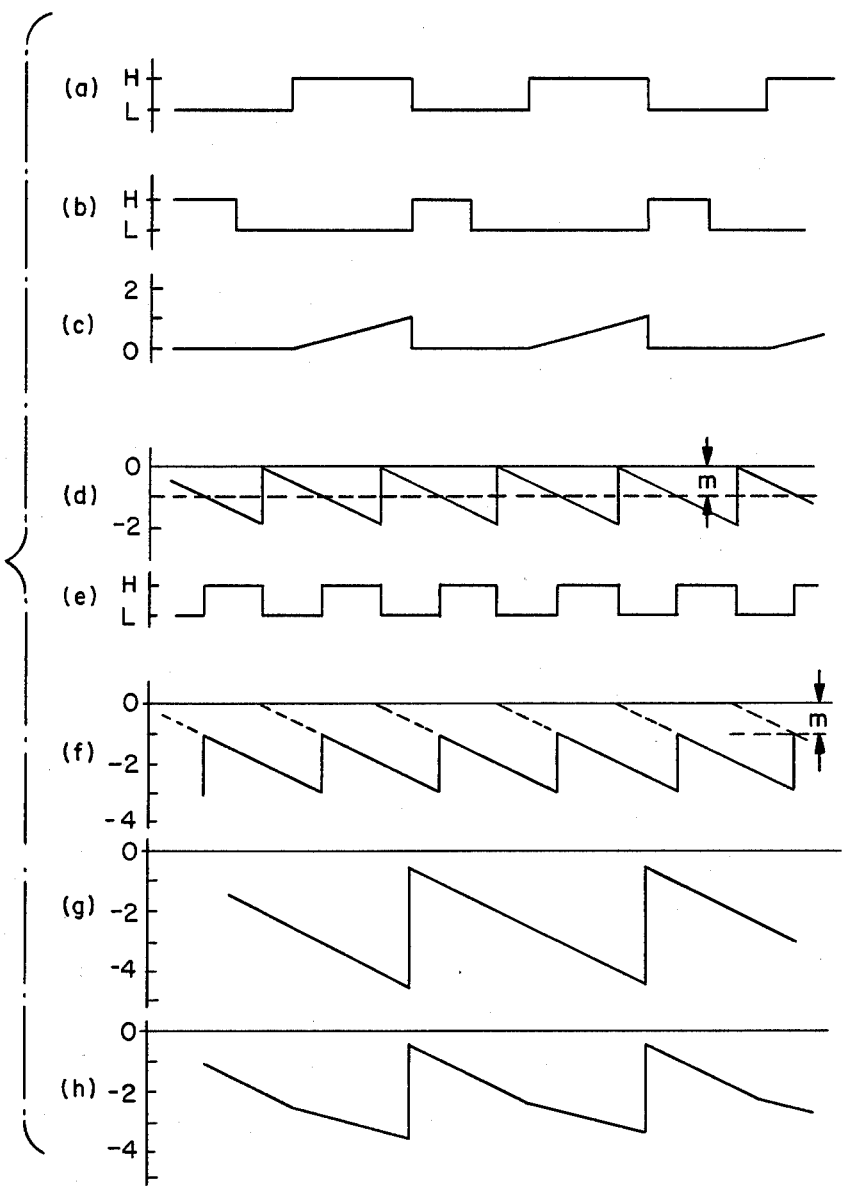
FIGS. 13(a)-(h) shows signals appearing at various points of the operational circuit 33 which includes the counter unit of FIG. 12.

FIG. 13 shows signal waveforms at various points of the circuit of FIG. 12. FIGS. 13(a), 13(b), and 13(c) respectively correspond to FIGS. 10(a), 10(b) and 10(d). FIG. 13 (d) shows the relationship between the data m and the input signal of the comparator 149. FIG. 13(e) shows the output signal of the comparator 149. FIG. 13(f) is the output signal of the second counter 148 which has been preset by the output of the counter 138 in accordance with the timing of the positive edge of the output signal of the level comparator 149. FIG. 13(g) shows the output signal of the output counter 172 which has been preset by the output of the second counter 148 in accordance with the timing of the negative edge of the output signal of FIG. 13(b).

These output signals are converted to analog signals by the D/A converters 55 and 56 and added to the output signal of the still pattern generator 51 by the adders 57 and 58. Since second counter 148 is preset by the output of the first counter, which is equal to m, the waveform of the output signal of the second counter is biased by an amount corresponding to the value of m with respect to that of FIG. 10(f).

Figure 14:
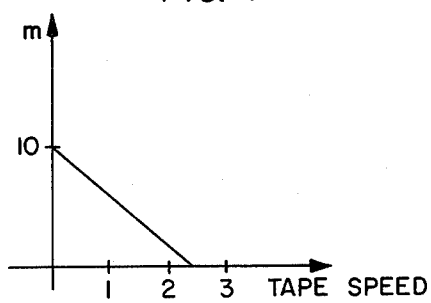
FIG. 14 shows the relationship between the data m and the tape speed at the counter unit of FIG. 12.
Figure 15:
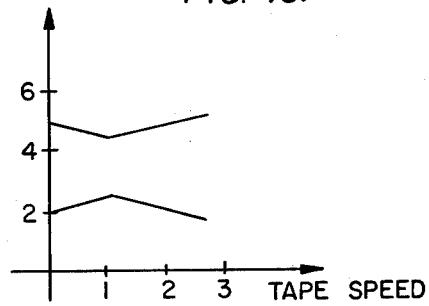
FIG. 15 shows the range of the output signal of the operational circuit 33 which includes the counter unit of FIG. 12 inputted with the data m of FIG. 14.

As mentioned above, the data m shifts the output signal of the operational circuit to keep the video heads in an on-track condition at any tape speed. Then, the value of the input data m which is inputted at the terminal 151 is arbitrarily chosen in the range of from 0 to the maximum count value of the first counter 138. In this case, the value of maximum count is 10. Accordingly, the range of the output signal of the operational circuit 33 can be shifted 10 counts of the sub-control signal, i.e. shifted 2 track pitches. If the value of data m is selected according to the tape speed as shown in FIG. 14, the output signal of the operational circuit 33 changes as shown in FIG. 15. FIG. 15 shows that, the center of the range of the output remains constant regardless of the tape speed, and the area of the upper peak level and the lower peak level expand equally as tape speed increases.

What is claimed is:

1. A tracking system for a video recorder/reproducer employing a record medium having tracks for recording video signals and control signals which are representative of the record position of said video signals, said system comprising:
   a transducing means for reproducing video signals recorded along said track on said record medium;
   a positionable means with said transducing means mounted at a location thereon, said positionable means being movable at said location for displacing position of said transducing means;
   a control signal reproducing means for reproducing said control signals recorded along said track on said record medium;
   a means for dividing interval of said control signals, said dividing means developing sub-control signals whose number is representative of the transported length of said record medium;
   a rotation phase detector for detecting the rotating phase of said transducing means and for providing an output signal corresponding thereto;
   an operational means for developing a displacement pattern signal which is representative of the location of said video track recorded on said record medium relative to said transducing means by using said control signals, said sub-control signals, and said output signal from said rotating phase detector; and
   a means for supplying said displacement pattern signal to said positionable means, wherein said operational means comprises: (1) a still pattern generator for developing a still pattern signal whose value is zero at a beginning of scanning of said transducing means and whose value corresponds to one track pitch at an end of scanning of said transducing means, (2) a counter unit for counting said sub-control signals and for generating bias signals and (3) an adder which adds the output signals of said still pattern generator and the output of said counter developing said displacing pattern signal; and wherein
   said counter unit comprises: (1) a first counter which is reset by said control signals and counts said sub-control signals, (2) a second counter which is preset to a predetermined value m when an output signal of said first counter becomes larger than m and which counts said sub-control signals, and (3) a third counter comprising two separate counters, each of which is preset to an output signal of said second counter at a predetermined time and which counts said sub-control signals, outputs of said third counter comprising two separate counters being applied to said adder, whereby said transducing means is capable of tracking properly on said recorded video track at an arbitrary transporting speed of said record medium.

2. A tracking system as claimed in claim 1, wherein said dividing means comprises: a rotary disk which rotates with running of said record medium, and a pulse generator which develops pulse signals in proportion to the rotating angle of said rotary disk.

3. A tracking system as claimed in claim 1, wherein said control signal reproducing means comprises a magnetic head which responds to magnetic flux.

* * * * *